United States Patent Office 3,682,643
Patented Aug. 8, 1972

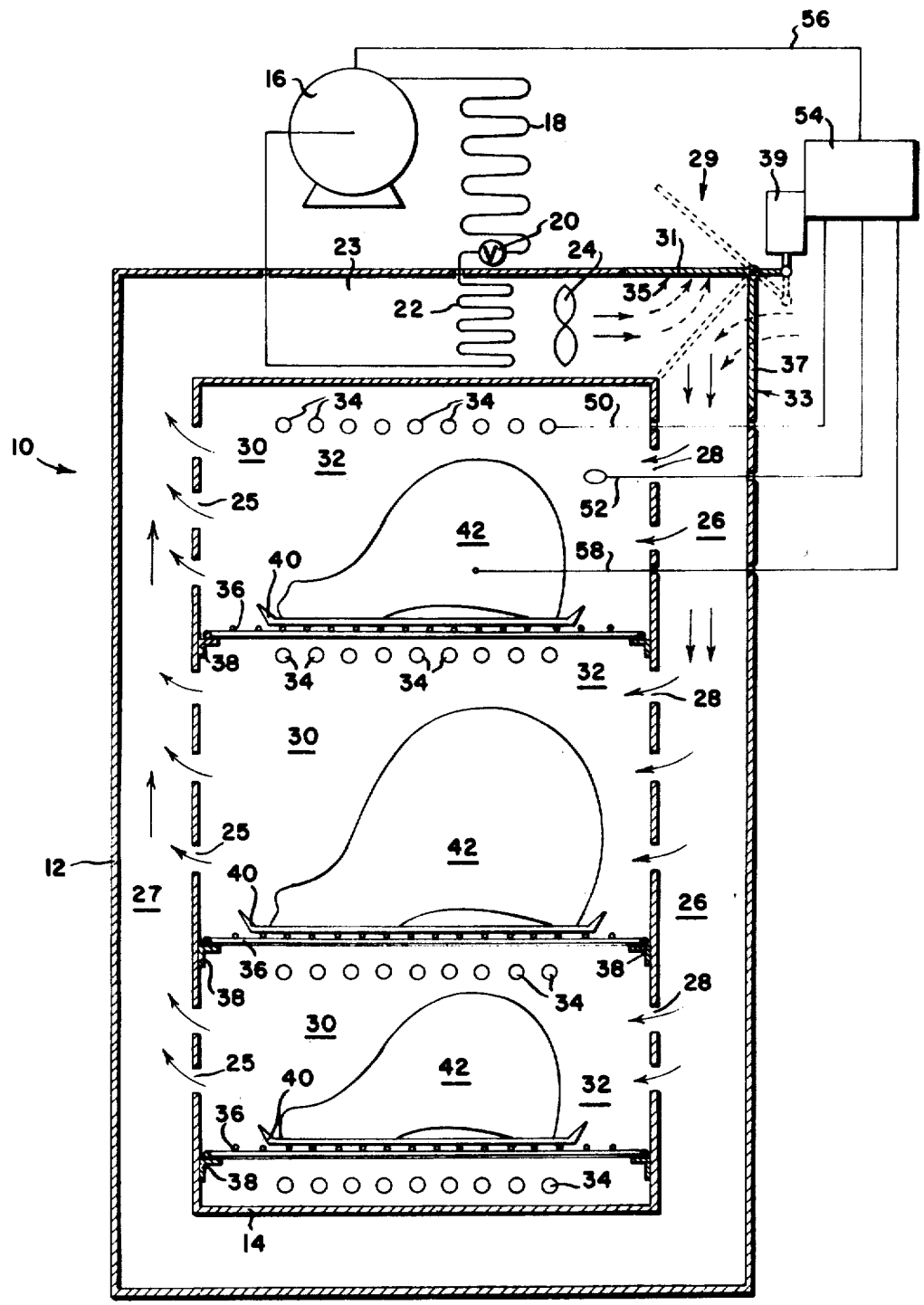

3,682,643
METHOD FOR COOKING FOODS USING INFRARED RADIATION
Lawrence H. Foster, 11 Ogden Road, Scarsdale, N.Y. 10583
Filed July 15, 1969, Ser. No. 841,779
Int. Cl. A23l 1/00
U.S. Cl. 99—1  12 Claims

ABSTRACT OF THE DISCLOSURE

A method of cooking food from a frozen raw state to a cooked ready-to-serve state by a process of subjecting the food to controlled pulsations of infrared radiation in a controlled ambient atmosphere.

---

This invention relates to a method of cooking food and more in particular to a method of cooking food from a fully-frozen raw state to a fully-cooked ready-to-serve state in one continuous operation.

The demands of preparation of large quantities of food for immediate consumption, for example at large banquets, cafeterias, restaurants, and other mass food service facilities, have accentuated the problem of preparing food ready for service while maintaining its maximum desirable characteristics of taste, texture and nutrition. Conventional cooking ovens have not been found to be entirely satisfactory in the preparation of large quantities of food, especially where a variety of dishes are necessary in order to afford a sufficient selection for varied individual tastes. Problems arise in controlling the serving state of various meat dishes, i.e., rare, medium or well done, and in preventing overcooking which may impair the taste of various side dishes such as vegetables and potatoes.

One proposed solution to the problem of mass food preparation is to reconstitute frozen dishes, that have been initially cooked and frozen, by controlled thawing so that the desired qualities of taste, texture and nutritive values are not impaired. Examples of equipment which can accomplish this type of reconstituting are disclosed in United States Letters Patent 3,261,394 and 3,282,331 to Foster et al. While the reconstituting process has been found to be quite satisfactory in returning frozen fully-cooked foods to a ready-to-serve state without impairing any of the desired qualities of the food, it has been found that it is not always feasible or desirable to have large quantities of fully-cooked frozen food on hand. Further, in many instances, it would be advantageous to be able to cook rapidly large quantities of food directly from the raw frozen state to the fully-cooked, ready-to-serve state without impairing any of the desirable characteristics of the food.

Accordingly, it is an object of this invention to provide a method of cooking raw frozen food to a fully-cooked, ready-to-serve state rapidly and efficiently in a manner by which one is able to sustain high volume production. It is a further object to provide a method for processing raw frozen food from a frozen state to a predetermined desired serving state. Another object is to bake bread products rapidly from a raw frozen state through proofing and baking stages in a manner which will give superior results under quantity baking conditions. It is a further object to provide unitary equipment which is efficient and dependable and can be used to store and refrigerate raw frozen foods, and then can be used to thaw the food and to cook the food to a ready-to-serve state.

In the drawing:
The single figure of the drawing is a somewhat schematic representation of apparatus which constitutes one embodiment of the present invention.

In the illustrative embodiment of the present invention, raw frozen foods are stored in a compartment and subjected to either freezing or infrared heating, and in which the temperature can be maintained at any desired point between −20° F. and hot oven conditions. The food is subjected to heating by timed cycles of infrared radiation while the temperature of the air surrounding the food is closely controlled. The heat energy input to the food is carefully controlled so that the heat is distributed through the food without causing deleterious effects or overcooking any part of the food. The temperature in the food is controlled so that the surface temperature never exceeds the permissible maximum for that particular food. This ensures preservation of the desired qualities of taste, texture and nutritive values of the food.

Referring to the drawing, there is shown a cabinet-type freezer-oven unit 10 having an insulated outer shell 12 and an inner shell 14. The inner shell forms a cavity 30 with a front access opening which is closed by a conventional door structure (not shown). Subfreezing temperatures within the interior of the unit may be maintained by a refrigeration unit comprising a compressor 16, a condenser 18, expansion valve 20 and an evaporator 22 in a passageway 23. A blower 24 circulates cooled air, as indicated by the arrows, downwardly at the right through a passageway 29 between inner shell 14 and outer shell 12, and thence through spaced openings 28 in the shell side wall and across cavity 30. The air passes from the cavity through openings 25 in the shell side wall and thence flows upwardly through passageway 27 back to passageway 23 and through evaporator 22.

Positioned at the juncture of passageways 23 and 26, there is a control vane assembly 29 formed by vanes 31 and 37 which may be swung between the full-line and broken line positions shown. When in the full-line position, only cooled air is circulated as described; and, when in the broken-line position, the air from fan 24 is discharged through an opening 35 at vane 31 and fresh air is drawn in through an opening 33 at vane 37 and flows through cavity 30. A control 39 moves the vane assembly away from the full-line position when it is desirable to permit a controlled amount of the air from fan 24 to be discharged at 35 (see broken line arrows) and to permit a corresponding amount of fresh air to be drawn in at 33. That permits outside air to be used to assist in maintaining the desired temperature of the air being delivered to the cavity so as to provide a predetermined ambient air temperature within the cavity. That is, when it is desirable to maintain refrigerated conditions within the cavity 30, the vane assembly is moved to the full-line position, and the refrigeration system is operated to provide the desired cooled air. However, when a relatively high temperature is desired in cavity 30, the refrigeration system is stopped so that hot air is circulated and the vane assembly is moved to a position which permits the entry of a controlled amount of fresh air while permitting a corresponding amount of hot air to be discharged through opening 31. With that mode of operation the mixture of hot air and fresh air is circulated through cavity 30, and the position of vane assembly 29 is controlled to supply the proper mixture of hot air and fresh air to maintain the desired air temperature within the cavity.

Positioned within cavity 30 are banks of infrared electric heaters 34 which extend from the rear toward the front of the cavity and are rigidly mounted upon the rear wall 32. One bank of heaters is positioned directly below the top wall of the cavity and an additional bank is positioned directly below each of a series of horizontal racks 36 which are supported from the side walls of the inner shell by brackets 38. Racks 36 are adapted to support food to be cooked. In accordance with the present invention, the food may be positioned in pans or upon trays which may be of a material which transmits infrared radiation. When heaters 34 are energized, they produce infrared radiation, and they are energized in accordance with a predetermined timed cycle. Thus, for a part of the cycle, energy is supplied to heaters 34 so that they emit infrared radiation, and for part of the cycle energy to the heater elements is cut off so that they no longer emit infrared radiation. Reference is made to the above-noted Foster et al. Patent 3,261,394 for a description of a preferred circuitry to accomplish the timed pulse of the heaters 34.

According to the method of the present invention, raw frozen foods, for example roasts of beef 42, are quick frozen in the raw state and stored until it is desired to use them. The frozen roasts of beef are then placed in suitable roasting trays or pans 40 and placed on racks 36. The roasts of beef may be kept stored in its frozen state in the unit 10 by operating the refrigeration cycle to maintain the desired temperature in cavity 30. To begin cooking, the refrigeration cycle is modulated somewhat and at the same time the heater elements 34 are activated to emit predetermined time pulses of infrared radiation. The frequency and intensity of the infrared pulses emitted from heater elements 34 are controlled through a circuit 50 by a central control unit 54 which is preset according to the requirements for specific food to be processed, and which has temperature sensors connected to it through circuits 52 and 58.

The amount of refrigeration supplied is made responsive to the air temperature around the food as sensed by a heat sensor of circuit 52. The sensor output is then used by a control unit 54 which has been preset to a predetermined heating program for the specific food being processed to control the refrigerating cycle through circuit 56. If desired, a heat sensing element of circuit 58 may also be placed at the center of the food being processed and this temperature can be relayed to control unit 54 and also used to modulate the intensity of the refrigeration and heating cycles.

Since the equipment includes infrared heating units in combination with a refrigeration unit, both under precise thermostatic control, any ambient temperature between freezing and hot oven temperatures may be maintained and controlled. Hence, according to the principles of the present invention, when it is desired to begin cooking, timed pulses of radiant heat energy are directed toward the food while precise control of the air temperature around the food is maintained through the refrigerating effect of the air circulated by blower 24 through the openings 28 and 25 in the walls of the liner 14.

Hence, for the food product specifically illustrated, i.e., the raw frozen roast beef 42, the cooking cycle proceeds as follows. Infrared radiation is pulsed at predetermined timed intervals, for example seven and one-half seconds on and seven and one-half seconds off, while a controlled ambient temperature, as sensed by heat sensor 52, is maintained at a temperature of approximately 200° F. This is accomplished by controlling the refrigerating cycle so that refrigerated air at the correct temperature is continuously forced across the meat 42 to maintain the 200° F. ambient temperature. The infrared radiant energy pulsed by the heating elements 34 is absorbed by the surface layer of the meat during that part of the pulsation cycle when the heater elements 34 are emitting radiation. When no infrared energy is emitted during the off period of the cycle, heat which has been absorbed by the surface layer of the meat passes by conduction to the interior of the meat. Hence, during each off period, the interior of the body of meat cools the exterior layer, and during the entire portion of each cycle there is a continuous passing of heat toward the colder center. The length of each heating pulse and the total length of the cycle are so regulated that the temperature of the entire body of meat is elevated at a rapid rate without, at any time, subjecting the outer layer of meat to excessive temperatures. That result is possible because the air temperature surrounding the meat is precisely controlled. Thus, during the complete program of the heating cycles, heat is delivered to the food until it is first completely thawed and thereafter cooked. In this way, the temperature gradient in the meat is controlled so that the surface temperature never exceeds approximately 200° F. The controlled heating process is continued until the temperature of the entire body of meat is uniformly raised until the center of the meat reaches a temperature of approximately 115° F. At that time, control unit 54 reduces the control temperature for the refrigeration system so as to increase cooling of the air which is being circulated, thus dropping the temperature of the air surrounding the meat to 90° F. That sharp drop in the ambient air temperature causes a reversal of the heat flow, i.e., heat flows from the meat to the air by conduction. As one illustrative example, the cooling effect is so controlled as to cause the body of meat to level off at a temperature of the order of 130° F. which is the temperature of "rare" roast beef. For well done roast beef the temperature of the air being circulated is reduced a lesser amount so that the temperature of the air surrounding the meat is of the order of 100° F. and the temperature of the entire body of meat levels off at a temperature of about 140° F. During that leveling off of the temperature, the pulsations of the infrared radiant heat are continued, but the simultaneous cooling prevents the exterior layer of meat from going above a temperature of the order of 140° F. or less when desired.

Rather startling results have been accomplished by the preceding method of cooking roast beef which heretofore have been unattainable by any other method of cooking roast beef. Characteristically, rare roast beef cooked by conventional means, when sliced, has a gradual variation of coloring from a black or charred exterior portion of very narrow width around the perimeter of the slice to a small pink and juicy center portion. Roast beef prepared according to the method of the present invention produces a slice which may have a thin dark or charred ring on the outside while the rest of the slice is uniformly pink and juicy. Substantially the complete slice of roast beef is in the same pink and juicy state that the conventional ovens can impart only to the centermost portions of a slice.

The present invention provides an improved method for the application of heat to frozen foods which reduces the time to exposure of the frozen foods to that heat. Cooking frozen foods in a short time greatly reduces shrinkage of the product and thus results in large economic benefits to the user. Further economic advantage is also derived from the fact that the shorter cooking time also permits preparation of a greater amount of food over a specific period of time.

Several tests have been performed with equipment developed from this invention. These tests prove that the wave length of the emitted radiant heat is 1.3 microns. This is a very efficient wave length for transmitting heat energy to the surface of a product. The tests also proved that when operated in the high temperature range, this equipment produced the desired cooking results in one-fourth the time required by any other means of cooking in conventional ovens. In the low range of 200° to 220° F., the equipment proved to be even more efficient in producing the desired results in only one eighth the time required by conventional ovens. These results were obtained because this equipment is capable of delivering more heat energy per unit area to the product surface than in a conventional oven. This phenomenon occurs because in a conventional oven the conduction and convection of heat is partially blocked by a layer of air along the surface of the food which acts as "skin effect" insulation. This blockage is further aggravated by small cavities or pockets in the food where passing streams of hot air do not displace air which has been cooled by contact with the food.

As an example of the speed and efficiency with which the method of the present invention lends itself to cooking a raw frozen roast beef to a fully cooked uniformly rare ready-to-serve state, a ten pound roast beef may be completely cooked from the raw fully frozen state in fifty minutes as compared to the conventional cooking time from the raw unfrozen state of approximately 25 minutes per pound.

The present invention, of course, is not limited to cooking roast beef but lends itself to many varieties of frozen raw foods. As an example thereof, the following table shows a few of the various food products and their approximate cooking times from a fresh frozen uncooked state at approximately 0° F. to serving temperature.

TABLE I

| Food product at approximately 0° F. | Approximate product thickness | Approximate time to serving temperature, mins. |
| --- | --- | --- |
| Hamburgers, 3″ dia | ⅜″ | 4 |
| Chicken parts, cut-up | | 20 |
| Frankfurters, 5″ long | | 5 |
| Veal cutlet, breaded | ⅜″ | 5 |
| Beef steak, 7″ x 5″ | ¼″ | 10 |
| Do | 1″ | ¹11 |
| Fish fillet | ⅜″ | 7 |
| Pork chops | ½″ | 9 |
| Do | 1″ | 12 |
| Salmon steak | 1″ | 12 |
| Pizza pie, 9″ dia | ⅜″ | 7 |
| French fries, pre-blanched | | 5 |
| Coconut custard pie, 26 oz.—8″ dia | | 40 |
| Apple pie, 26 oz.—8″ dia | | 25 |
| Pumpkin pie, 26 oz.—8″ dia | | 35 |

¹ Medium rare.

The method of the present invention also is amenable to baking dough products from a raw frozen state to a fully baked state by first taking the raw frozen dough through a thawing stage where the dough is uniformly thawed without baking, thence through a proofing stage, i.e., letting the bread rise by action of the yeast and then, as soon as the bread has risen a proper amount, baking until the bread is completely baked. The thawing and proofing are both accomplished by pulsing radiant energy to the bread in a controlled ambient atmosphere so that no baking occurs until after the bread has been proofed.

In accordance with the present invention, the ambient temperature within the oven cavity is so controlled as to insure the delivery of heat to the food at a rate which is equal to or slightly below the optimum rate during the entire thawing and cooking process. In accomplishing that result, radiant heat is delivered to the exposed surfaces of the food in accordance with a predetermined program, and the ambient air temperature is maintained at a level to carry away heat from the food surfaces or deliver heat to the food surfaces, as is required. It is recognized as a practical mode of practicing the invention that a control factor must be to insure against the delivery of heat inwardly from the exposed surfaces at an excessive rate, even at the expense of passing heat into the body of food at a rate which is less than the optimum rate. The program for the radiant heaters, as well as the temperature of the air being delivered to the oven cavity, can be determined for each type of food, the size or thickness of the body of food, the specific heat and initial temperature of the food, and the final temperature which is desired so that the food will be cooked to the desired condition, i.e., "rare," "medium" or "well done" for roast beef. However, the equipment, including the control systems for practicing the invention, generally is adapted for use with a wide variety of foods, and there are practical limitations upon the "sophistication" or range of control functions which can be provided in standard commercial equipment. Accordingly, as explained above in the illustrative example for cooking roast beef, the heating impulse program has been indicated as remaining unchanged during the entire thawing and cooking process, even though the rate at which the heat is passed into the body of meat is substantially less at the end of the process than at the beginning. The ambient air temperature may then be reduced at the end of the cooking process to carry away the amount of heat which is in excess of that which is permitted to pass into the body of meat. When the total amount of heat within the body of meat is sufficient to provide the desired cooking throughout the entire body, no more heat is delivered to the meat. To accomplish that, the temperature of the air delivered to cavity 30 may be reduced very drastically so as to carry away heat by conduction from a substantial outer layer of the body of meat.

It is recognized that various products require special attention. Frozen pieces of raw dough, which require thawing, proofing and baking, require special programming to insure that the entire body of dough rises the required amount during the proofing period, and to stop the rising and start the baking at the right time. Frozen products which contain discrete portions of a variety of different foods also require special attention to insure that each variety of food is cooked sufficiently but is not over-cooked. It is then seen that the method of the present invention provides a unique and novel way to cook volume quantities of food from the raw frozen state to a desired serving state in an effective and expedient manner without deleterious effects as to taste, texture and nutritive properties.

Although the preceding presentation has illustrated and described one possible embodiment of this invention, it is to be understood that various changes and modifications may be made without departing from the spirit and scope of the invention defined in the following claims.

What is claimed is:

1. The method of cooking foods from a frozen raw state to a cooked ready to serve state which comprises the steps of, delivering heat to the exposed surfaces of the food at an average rate which is in excess of the rate at which heat would pass into the body of food, by subjecting said exposed surfaces to predetermined timed pulses of infrared radiation during a portion of the cooking process without producing overcooking of the layer of food adjacent said exposed surfaces, wherein said infrared radiation is on for a sufficient period of time to enable heat to be absorbed by the surface layer of food and off for a sufficient period of time to enable heat to pass by conduction to the interior of the food, while controlling the ambient temperature at said exposed surfaces at approximately 200° F. by selectively introducing refrigerated air at controlled temperatures adjacent said surfaces to extract heat from said exposed surfaces during a period of the process at a rate which insures against such overcooking, and decreasing the temperature of said refrigerated air when the center of the food reaches a predetermined temperature to produce a reversal of heat flow from the food to the air, while maintaining said pulses.

2. The process as described in claim 1, wherein said food is positioned in an oven cavity and said refrigerated air is supplied in a stream to said cavity.

3. The process as described in claim 2, wherein said pulses of infrared radiation are produced by infrared radiant heating means which are energized and de-energized to produce repeated cycles, each of which includes a period during which radiant heat is radiated and a period during which no heat is radiated.

4. The method as described in claim 1, which includes circulating said refrigerated air in a stream along said exposed surfaces.

5. In a method for cooking foods from a frozen raw state to a cooked ready to serve state, the steps of subjecting exposed surfaces of food to predetermined timed pulses of infrared radiation, wherein said infrared radiation is on for a sufficient period of time to enable heat to be absorbed by the surface layer of the food and off for a sufficient period of time to enable heat to pass by conduction to the interior of the food, while simultaneously maintaining the air temperature at said exposed surfaces at a predetermined value which is approximately 200° F. and reducing said air temperature to a lower value for a second predetermined interval of time when the center of the food reaches a predetermined temperature while continuing to subject said exposed surfaces to timed pulses of infrared radiation.

6. The method as described in claim 5 wherein the food is a roast of beef and wherein said predetermined value is maintained at approximately 200° F. until the lowest internal temperature of the roast of beef reaches a value of the order of 115° F. and wherein the reduction of air temperature then takes place to a value of the order of approximately 90° to 100° F.

7. The method as described in claim 5 wherein the food is a frozen piece of raw dough which requires thawing, proofing and baking, and wherein said air temperature during said second interval is maintained at a value to proof the dough, and thereafter elevating said air temperature to bake the dough.

8. The method as described in claim 5 which includes, circulating air continuously along a path which extends past said exposed surfaces and through a cooling zone wherein the air is cooled by refrigeration.

9. The method as described in claim 8 which includes, supplying outside air with said air which has been cooled in said cooling zone.

10. The method as described in claim 5 which includes passing a stream of air along a path which extends past said exposed surfaces, providing for cooling a stream of air, and utilizing air which has been so cooled or outside air or a mixture of the two to provide the stream of air flowing along said path.

11. In a method of roasting meats which comprises the steps of, delivering pulsating infrared radiant heat to exposed surfaces of a body of meat in accordance with a predetermined program with respect to the heat delivered during each pulse, wherein said infrared radiant heat is on for a sufficient period of time to enable heat to be absorbed by the surface layer of food and off for a sufficient period of time to enable heat to pass by conduction to the interior of the food, while simultaneously circulating a stream of air along said exposed surfaces to provide for transfer of heat between the air and said exposed surfaces, to maintain the air temperature at the exposed surfaces at approximately 200° F. and lowering said value of the air temperature when the minimum internal temperature of the meat approaches the desired internal temperature of the meat when it is fully cooked, while maintaining said pulses.

12. The method as described in claim 11 wherein the meat is a roast of beef and the temperature of the fully cooked meat is approximately the range of 130° F. to 140° F.

References Cited

UNITED STATES PATENTS

| | | | |
|---|---|---|---|
| 3,003,409 | 10/1961 | Mills | 219—411 X |
| 3,265,861 | 8/1966 | Perlman | 219—411 X |
| 3,282,331 | 11/1966 | Foster et al. | 99—1 UX |
| 3,394,007 | 7/1968 | Campbell | 99—1 |
| 3,470,942 | 10/1969 | Fukada et al. | 165—30 X |
| 3,501,620 | 3/1970 | Saver | 99—234 T X |
| 3,536,129 | 10/1970 | White | 165—30 X |
| 3,556,817 | 1/1971 | Jeppson | 99—192 |

FRANK W. LUTHER, Primary Examiner

S. L. WEINSTEIN, Assistant Examiner

U.S. Cl. X.R.

99—90 R, 107, 217, 234 T, 352, 447; 165—30, 64; 219—405, 411